United States Patent Office 3,224,254
Patented Dec. 21, 1965

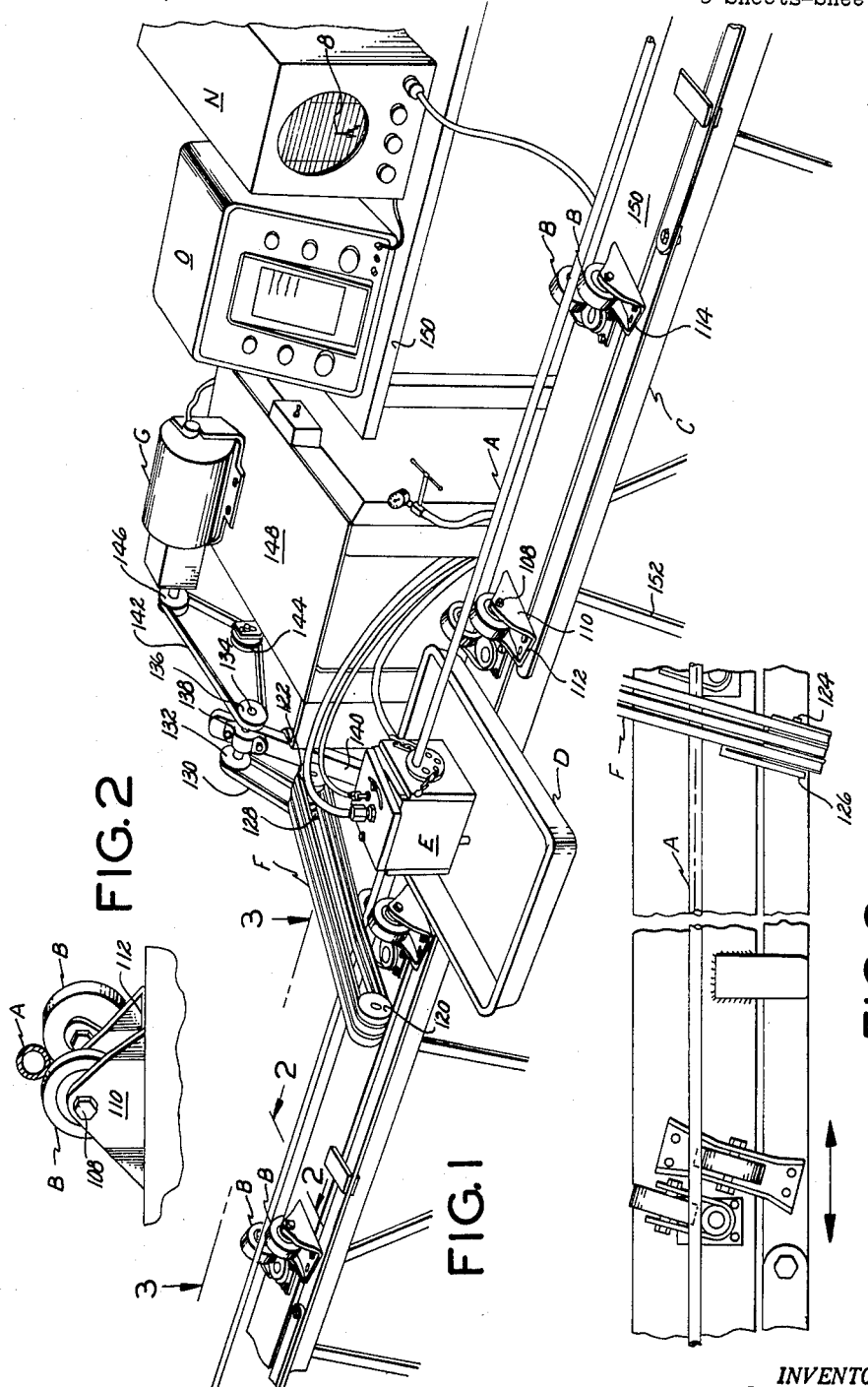

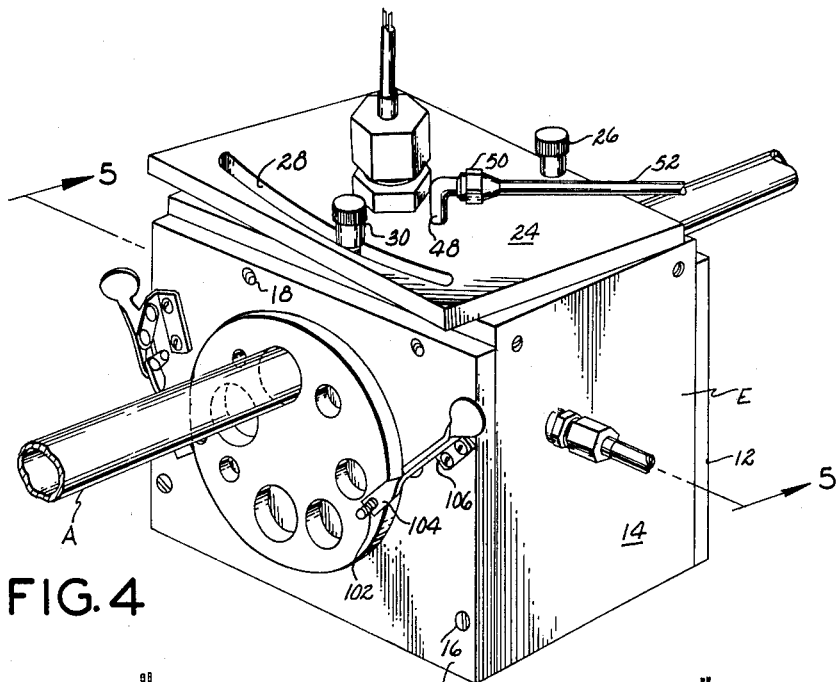
FIG. 4
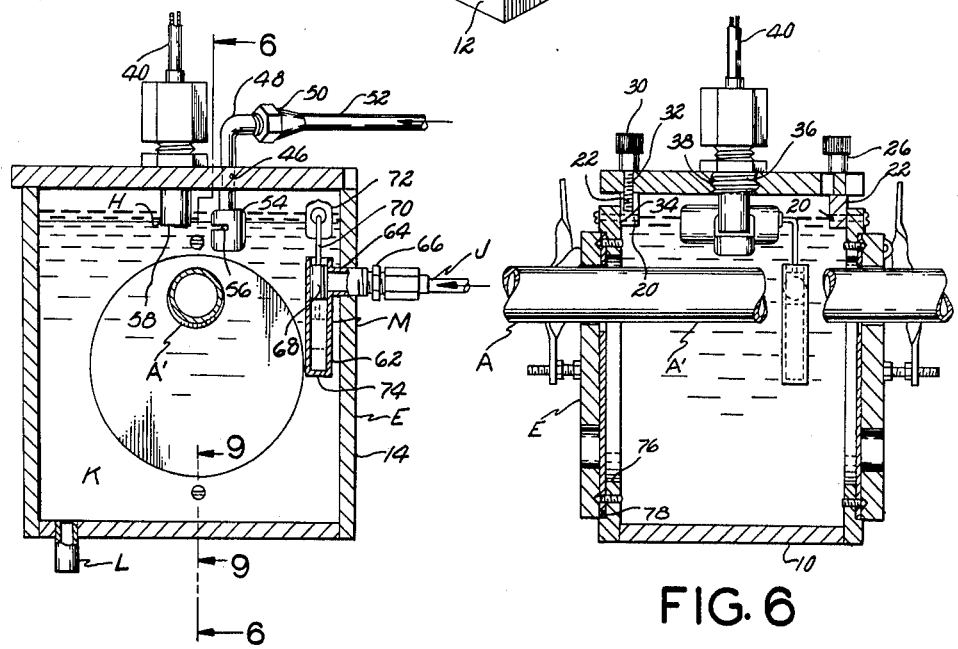
FIG. 5
FIG. 6
INVENTOR.
JOE H. LOVING
BY
William C. Babcock
ATTORNEY

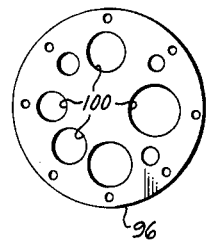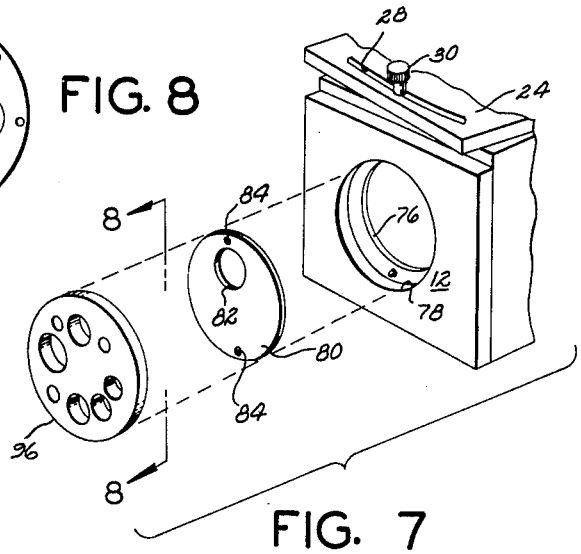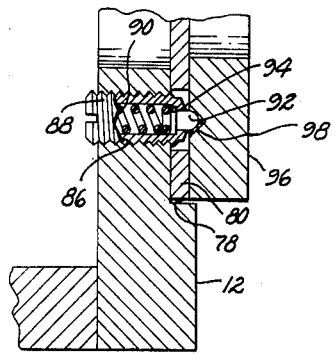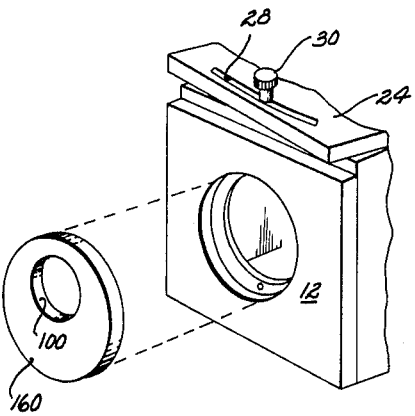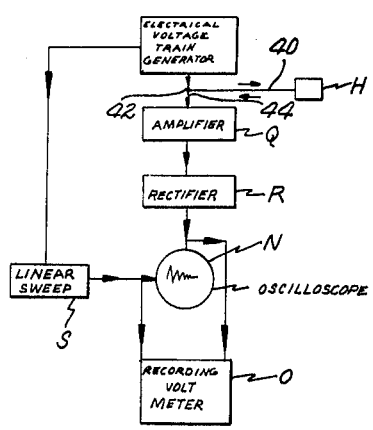

3,224,254
ULTRASONIC INSPECTION APPARATUS FOR ELONGATE MEMBERS
Joe H. Loving, Lakewood, Calif., assignor to General Inspection Laboratories, Inc., Bell, Calif.
Filed Dec. 12, 1961, Ser. No. 158,668
3 Claims. (Cl. 73—71.5)

The present invention relates generally to the field of ultrasonic testing, and more particularly to the rapid and efficient inspection and testing of elongate members for flaws.

During the past few years there has been a constantly increasing trend towards the testing for inhomogeneities in the density of materials by the use of high frequency vibrations. In general, such testing consists of sending high frequency vibrations into the metallic member to be tested, and a determination of the time intervals of the arrival of the direct and reflected vibrations at a predetermined position relative thereto. By the use of such high frequency vibrations, inhomogeneities on the surface or completely concealed within the confines of the part being tested can be detected, as well as flaws and other irregularities that may be located adjacent the surface of the part. Although the use of such high frequency vibrations in the testing of materials gives highly accurate results, testing by this means heretofore had the disadvantage that prior to the present invention it could not be economically carried out in the testing of elongate members such as tubes, rods, and the like.

A primary object of the present invention is to provide an apparatus for the rapid and efficient testing of elongate members such as rods, tubes and the like for inhomogeneities in the density of the material defining the same, as well as thinning of the wall structure thereof due to erosion and corrosion which frequently occurs in used pipe and tubes.

Another object of the invention is to provide an apparatus whereby a succession of elongate members varying in transverse cross-sectional area may be consecutively tested without appreciably slowing down the testing operation.

A still further object of the invention is to provide an apparatus for testing elongate members by high frequency vibrations by use of which the possibility of obtaining false readings is substantially avoided due to removal of all air bubbles from the liquid through which the vibrations are transmitted, both before and during the testing operation.

Yet another object of the invention is to provide an apparatus by which the entire wall structure of a tubular member can be inspected for flaws, pitting and other imperfections by high frequency vibrations during the testing thereof.

A still further object of the invention is to supply an apparatus for the testing of elongate members that is of relatively simple structure, easy and convenient to use, rapid in operation, and which provides a permanent record of the testing results on each elongate member tested.

These and other objects and advantages of the invention will become apparent from the following description thereof, and from the accompanying drawings illustrating the same, in which:

FIGURE 1 is a perspective view of the apparatus used in the testing of elongate members by high frequency vibrations;

FIGURE 2 is a fragmentary side elevational view of a portion of the apparatus taken on line 2—2 of FIGURE 1;

FIGURE 3 is a fragmentary top plan view of a portion of the apparatus taken on line 3—3 of FIGURE 1;

FIGURE 4 is a perspective view of the container in which the testing of a section of an elongate member takes place;

FIGURE 5 is a transverse cross-sectional view of the container shown in FIGURE 4 taken on line 5—5 thereof;

FIGURE 6 is a vertical cross-sectional view of the container shown in FIGURE 5 taken on line 6—6 thereof;

FIGURE 7 is an exploded perspective view of a portion of the container shown in FIGURE 4;

FIGURE 8 is a front elevational view of a disc forming a part of the container shown in FIGURES 4 and 7;

FIGURE 9 is a fragmentary cross-sectional view of the container shown in FIGURES 4 and 7, and showing how a disc forming a part thereof is adjustably held at a desired position relative thereto;

FIGURE 10 is an exploded perspective view of a disc and a portion of the container shown in FIGURE 4 which are used when it is desired to test a number of elongate members all of the same transverse cross section; and FIGURE 11 shows in block schematic form, the general layout of the pulsed wave train generating means and devices used to receive the reflected trains from the part being tested.

Referring now to FIGURES 1 to 6 of the drawings for the general arrangement of the invention, it will be seen that an elongate member A to be tested for flaws is supporter for longitudinal and rotational movement on a number of pairs of rollers B. The paired rollers B are supported in longitudinally spaced, aligned relationship by a table C. A tray D is supported on table C.

An assembly E is provided, best seen in detail in FIGURES 4 to 6, wherein the testing of the elongate member A takes place. The assembly E is mounted above the tray D and supported in a fixed elevation relative thereto. A number of endless resilient belts F frictionally engage the upper surface of elongate member A. When belts F are rotated upon actuation of a motor G, the member A is rotated and moved to the right as illustrated in FIGURE 1.

A piezo-electric element H that is not only adapted to send out pulsed trains of high frequency vibrations but is adapted to receive the same, is situated within the upper confines of the assembly E, as may best be seen in FIGURES 4 to 6. A first conduit J supplies a liquid K to the interior of the assembly E. A drain L is connected to the lower portion of assembly E. A float valve M operatively associated with the conduit J assures that a body of liquid K will be maintained at a desired liquid level in the assembly E. When the liquid level is so maintained, a section A' of the tubular member A is immersed in the liquid K in the assembly E.

An oscilloscope N and recording voltmeter O are provided, as shown in FIGURE 1. Also, a voltage train generator P, amplifier Q, rectifier R and linear sweep S are provided which are operatively associated with the oscilloscope N and recording voltmeter O as shown in FIGURE 11. The voltage train generator P generates a voltage train of high frequency which is followed by a time interval when no voltage is generated.

The high voltage train is applied to the piezo-electric element H which has a natural frequency that is substantially that of the applied train. The element H, excited by the voltage train applied thereto, radiates a mechanical vibration train at ultrasonic frequency into the liquid K in assembly E towards section A'. This mechanical vibration train is reflected back to the piezo-electric element H to cause vibration thereof and generation of a voltage train during a time interval when the generator P is not generating a voltage train. The greater the size of the flaw, the greater will be the percentage of the ultrasonic train wave reflected back to the element H. The element H will be mechanically vibrated in proportion to the quantity of the reflected wave train reflected back thereto.

The piezo-electric element H is connected to amplifier Q which not only receives the voltage trains originally sent out by element H, but the voltage trains generated by element H as the mechanical vibrations are reflected back thereto from the section A'. The output of the amplifier may or may not be rectified by the rectifier R. The output from rectifier R is fed to the vertical plates of the cathode ray oscilloscope N. Oscilloscope N is connected to the linear sweep S. The linear sweep circuit need not be described in detail as it is of a type well known in the art.

Recording voltmeter O is so connected to the circuit that a permanent record is made of the variations in the voltage trains that are amplified by the amplifier Q. By examining the permanent record provided by the recording voltmeter O, or watching for changes on the oscilloscope between the pattern of the high frequency pulse applied to the element H and that generated by the element due to mechanical vibrations reflected back from the section A', the presence of flaws in the section A' can be detected.

The size of the flaw will also be determinable, due to the height of the pip 8 that appears on the oscilloscope N and due to the percentage of the wave train reflected back to the element H from the flaw in the section A' being tested. The voltmeter O is so connected to the circuit that variations in the recorded voltage thereon, are proportional to the size of the flaw in the section A' causing these variations. The particular circuit used in generating an ultrasonic wave train, and receiving reflected portions thereof may be that disclosed in the F. A. Firestone Patent No. 2,398,701, which issued April 16, 1946. It will be apparent that the element H can be both the sender and receiver, or the element H merely the sender, and another similar element H (not shown) the receiver. Prior to using the oscilloscope N as above described, the oscilloscope is calibrated by causing wave trains to be reflected back from flaws of known dimensions in a test body (not shown).

In detail, the assembly E includes a rigid rectangular bottom 10, the flat vertical edges of which are sealingly gripped between the lower interior surfaces of two side walls 12 and two end walls 14. Side walls 12 have a number of bores extending through the end portions thereof, in which screws 16 are disposed to engage tapped bores (not shown) formed in the end walls 14. Each of the side walls 12 also has a number of longitudinally spaced bores formed in the upper portion thereof that are engaged by screws 18. The screws 18 in each side wall 12 engage tapped bores 20 formed in one of two rigid strips 22. Strips 22 project above the side walls 12, as can best be seen in FIGURE 6.

The end walls 14 are higher than the side walls 12, and the upper edges of the end walls are substantially flush with the upper surfaces of strips 22. A rectangular cover 24 is provided in which a bore is formed, located adjacent one edge thereof, and this bore is engaged by a thumb screw 26. Screw 26 engages a tapped bore (not shown) formed in the strip 22 stiuated on the right of the assembly as seen in FIGURE 6. An arcuate slot 28 is also formed in the cover 24 on the side thereof opposite that through which the thumb screw 26 extends. A second thumb screw 30 is provided that has a threaded shank 32 which projects downwardly to threadedly engage a tapped bore 34 formed in the strip 22 located to the left of the assembly as seen in FIGURE 6.

The piezo-electric element H is supported on the lower end of an externally threaded member 36 that engages a tapped opening 38 formed in the cover 24 (FIGURE 6). Member 36 is connected by an electrical conductor 40 to a junction point 42 in an electrical conductor 44 that extends from the voltage train generator P to the amplifier Q.

A bore 46 extends downwardly through the cover 24 adjacent the tapped bore 38. A tube 48 extends downwardly through the bore 46 and is rigidly affixed to the cover 24 by conventional means (not shown). The upper end of the tube 48 is connected by a conventional tubing coupling 50 to a conduit 52 that extends to a source of the particular liquid K being used in the assembly E.

Tube 48 has a hollow closed body 54 mounted on the lower end thereof, and this body has a slit aperture 56 formed therein that lies in a horizontal plane slightly below the lower surface 58 of the piezo-electric element H. Aperture 56 is so oriented relative to element H that as liquid K is discharged through the conduit 48, it flows from the aperture directly under element H and tends to remove all bubbles of air from liquid K that would be in the path of mechanical vibrations produced by the element H and directed downwardly to the section A'. When thumb screws 26 and 30 are loosened the cover 24 may be pivoted relative to the end walls 14 to dispose the piezoelectric element H at a desired lateral spacing from the center line of the elongate member A.

The valve M, as can best be seen in FIGURE 5, comprises a hollow cylindrical body 62 that is open at the top. A tubular arm 64 extends outwardly from body 62 horizontally through one of the end walls 14. By means of a conventional tubing fitting 66 the arm 64 is connected to the conduit J. A cylindrical valve member 68 is slidably movable in valve body 62. The valve member 68 has a projection 70 extending upwardly therefrom that is connected to a buoyant float 72. When the level of liquid K in valve assembly E has risen to a desired level the float 72 moves the valve member 68 upwardly in valve body 62 to obstruct flow of liquid from tubular arm 64, and valve body 62 into the confines of assembly E. The lower end of body 62 is closed by an end piece 74. The combined rate of liquid flow from valve M when it is fully open, and from the aperture 56, is slightly greater than the rate at which liquid K discharges from assembly E through conduit L. Prior to use of assembly E it is filled with liquid to substantially the level shown in FIGURE 5. Liquid is then discharged into assembly E through valve M and aperture 56. When the level of liquid in assembly E tends to rise about a predetermined elevation value, member 68 moves upwardly in body 62 to float 72 which momentarily obstructs further flow of liquid from valve M, or lessens the rate of flow therefrom into assembly E. The level of liquid K in assembly E is lowered by liquid flow from conduit L. Float 72 is then lowered to permit flow of liquid from valve M. The liquid level of liquid K in assembly E then starts to rise again and the above described cycle is repeated.

Each of the side walls 12 has a relatively large circular opening 76 formed therein, and the outer portion of each of these openings is in communication with a ring-shaped recess 78 formed in the outer portion of one of the side walls 12. Two circular first plates 80 are provided, as may best be seen in FIGURES 6 and 8, in each of which a circular opening 82 is formed. The cross-sectional area of each opening 82 is larger than that of the largest cross-sectional area of any elongate member A to be tested in the assembly. Each first plate 80 also has two diametrically opposed openings 84 formed therein. Each side wall 12 has two tapped bores 86 therein that are alignable with openings 84.

The bores 86 are engaged by hollow threaded members 88, each of which has a compressed helical spring 90 situacted within the confines thereof. Also, each of the threaded members 88 has a pin 92 therein that is at all times urged outwardly by spring 90. The inner end of each pin 92 develops into an enlarged portion 94 that serves to prevent the pin from being forced out of the member 88 by spring 90.

Two second plates 96 are provided, as shown in FIGURES 6, 7, 8 and 9, that are of substantially the same diameter as the first plates 80. Each plate 96 abuts against the outer surface of one of the first plates 80. Each plate 96 has a number of circumferentially spaced recesses 98 formed therein which are diametrically opposed and may be removably engaged by the pins 92. Circumferentially spaced openings 100 are formed in each plate 96, and the transverse cross section of these openings is such as to permit them to snugly and sealingly engage the exterior surface of a tubular member A of a particular external diameter.

The second plates 96 are held in abutting contact with the first plates 80 by two pairs of threaded members 102 that can be adjusted to bear against the exterior surface thereof. The paired members 102 are threadedly supported from pairs of oppositely disposed arms 104. Arms 104 are pivotally supported by brackets 106 from the outer surfaces of the side walls 12, as best shown in FIGURE 4.

One of the openings 100 in each of the second plates 96 will be of substantially the same transverse cross section as the opening 82 in first plate 80. When it is desired to use the invention in testing an elongate member A of a particular diameter, the arms 104 are pivoted outwardly, and the two second plates 96 rotated relative to the first plates 80 to place the second plates 96 in positions where openings 100 of a size that will snugly and slidably engage the external surface of the member to be tested are aligned with the openings 82 in the first plates 80. The arms 104 are then pivoted to the holding position shown in FIGURE 4.

Thereafter the thumb screws 26 and 30 are loosened and the cover 24 pivoted to a position where the piezo-electric element H is disposed at a desired off-set relationship from the center line of section A'. When the piezo-electric element H is so disposed, both reflected waves and shear waves are returned to the piezo-electric element H when it is not generating a train of waves, whereby both the reflected and shear waves result in formation of a wave pattern on the oscilloscope N as well as on the recording voltmeter O.

As previously mentioned, the elongate member A is rotatably supported on rollers B. Each of the rollers B is rotatably mounted on a shaft 108. Each shaft 108 is supported by two parallel, laterally spaced rigid wall members 110 that are connected on their lower ends by a base 112. Base 112 is affixed to the upper surface of table C by screws 114 or other conventional fastening means.

The endless belts F (FIGURE 3) are angularly disposed relative to the center line of the member A. When the belts F are rotated, the elongated member A, due to friction, is concurrently rotated therewith, as well as being longitudinally advanced to the right through the assembly E, as illustrated in FIGURE 1. This longitudinal movement to the right is, of course, caused by the angular positioning of the belts F relative to the center line of the tubular member A.

The belts F engage two pulleys 120 and 122. Pulley 120 is rotatably mounted on a shaft 124 that is affixed to an upwardly extending bracket 126 that is mounted on table C. Pulley 122 is connected to a driven pulley 128 from which a second endless belt 130 extends to a driving pulley 132. Driving pulley 132 is rigidly connected to a shaft 134 that has a second pulley 136 mounted on the opposite end thereof.

The shaft 134 is rotatably supported in a journal block 138 that is affixed to the upper portion of a rigid arm 140 that extends upwardly from the table C. An endless belt 142 engages the pulley 136, an idling pulley 144 and a pulley 146 that is driven by the motor G, as seen in FIGURE 1. The motor G is mounted on an upwardly extending frame 148 or other conventional supporting structure, preferably situated adjacent a table 150 on which the recording voltmeter O and oscilloscope N are supported.

When elongate members A are being tested that are all of uniform transverse cross section, two thick plates 160, shown in FIGURE 10, are disposed within the confines of the recesses 78, instead of the first plates 80 and second plates 96 shown in FIGURE 7. Plates 160 are formed in the same manner as the plates 96, other than that the plates 160 have but single openings 100' formed therein. The openings 100' are of such transverse cross section as to snugly and slidably engage the exterior surface of the elongate member A of a particular size being tested.

The operation of the invention is relatively simple. The elongate member A to be tested first has an end section thereof inserted within the confines of the assembly E, as shown in FIGURE 4. Liquid K is discharged into assembly E through conduit J until the liquid has risen to a desired level therein. Liquid K is also concurrently discharged through the conduit 52 to flow from the slit aperture 56 across the under surface 58 of the piezo-electric element H.

The electrical voltage train generator P is then energized to cause pulses of high frequency electric energy to be discharged to the piezo-electric element H. As a result of this discharge of high frequency current thereto, the element H mechanically vibrates, and in so doing ultrasonic waves are discharged downwardly by the element H toward the section A' of the elongate member A being tested, and these waves are returned as reflected and shear waves to the element H during a period when the element is not vibrating. These waves result in the mechanical vibration of element H to generate an electric current which is sent to the amplifier Q as previously mentioned.

The pattern of the original high frequency train as well as the reflected train is visually reproduced on the oscilloscope N, and the difference between these patterns indicates the presence of a flaw, if any, in the section A'. During the time the elongate member A passes through the assembly E, the section A' is constantly rotated at a sufficiently rapid rate that the entire wall surface of the member A is subjected to the action of the element H. As a result, any flaws at any location in the elongate member A will be detected.

During inspection of the member A as described, fluid K discharges from the slit 56 directly across the face 58 of the piezo-electric element H, and all air bubbles therein are removed from the liquid K. If such bubbles were not removed, they could interfere with the transmission of ultrasonic waves to and from the section A'.

Such interference with the passage of these ultrasonic waves would give rise to a pattern on the oscilloscope N and voltmeter O that would in some instances be interpreted to indicate the presence of flaws that actually are not present. After one elongate member A has been tested in the manner described, the forward extremity of the next member may be inserted within the confines of one of the openings 100, whereby consecutive testing of a number of elongate members can be easily and conveniently carried out. If there is a variation in the transverse cross-sectional area in one of the elongate members A, the plates 96 are merely rotated to provide openings 100 of an appropriate size to slidably and snugly engage the new elongate member A of a different transverse cross section.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A device for testing elongate members, including:

(a) a rectangular open-topped container having two longitudinally aligned openings formed in opposite sides thereof;
(b) first means in said openings for sealingly engaging said elongate member when the same is advanced through said container;
(c) a cover pivotally supported on top of said container;
(d) second means mounted on said cover and projecting therebelow for transmitting spaced pulses of ultra sonic waves through a liquid situated in said container to a section of said elongate member in said container, said second means including a wave train generating and receiving surface that is disposed in said container below the surface of said liquid;
(e) a hollow body having a slit formed therein, which body is affixed to said cover and disposed therebelow adjacent said second means, with said slit facing said second means and in horizontal alignment with said generating and receiving surface;
(f) third means for supplying said liquid under pressure to said hollow body to discharge a stream thereof transversely across said generating and receiving surface; and
(g) fourth means for discharging to and withdrawing liquid from said container at such rates that the free surface of said liquid is maintained at a predetermined elevation therein, with said second means being adjustable relative to the section of said elongate member in said container by pivotally moving said cover relative to said container.

2. A device as defined in claim 1 wherein, said first means comprise two circular plates rotatably and sealingly supported in said openings, which plates have a plurality of circumferentially spaced openings formed therein of different diameters that can be longitudinally aligned in pairs, with each of said pairs slidably and sealingly engaging an elongate member that extends therethrough.

3. A device as defined in claim 2 which further includes means for removably locking said plates in fixed positions relative to said container.

References Cited by the Examiner

UNITED STATES PATENTS

| | | | |
|---|---|---|---|
| 2,583,764 | 1/1952 | Buckholdt | 226—98 |
| 2,758,706 | 8/1956 | Quinlan | 226—98 |
| 2,795,133 | 6/1957 | Ots | 73—67.7 |
| 2,992,553 | 7/1961 | Joy | 73—67.8 |
| 3,063,290 | 11/1962 | Kaserman et al. | 73—67.8 |

RICHARD C. QUEISSER, *Primary Examiner.*

JOHN P. BEAUCHAMP, *Examiner.*